US005940306A

United States Patent [19]

Gardner et al.

[11] Patent Number: 5,940,306

[45] Date of Patent: Aug. 17, 1999

[54] DRAWER OPERATING SYSTEM

[75] Inventors: John F. Gardner, Penfield, N.Y.; Jane F. Laycock, West Chester, Pa.; Eric C. Norlin, Coatesville, Pa.; Shelly I. Slogoff, Chester Springs, Pa.; E. Ford Williams, Bryn Mawr, Pa.; Tobin H. Williams, Radnor, Pa.

[73] Assignee: Pyxis Corporation, San Diego, Calif.

[21] Appl. No.: 08/570,202

[22] Filed: Dec. 19, 1995

Related U.S. Application Data

[63] Continuation of application No. 08/418,624, Apr. 7, 1995, which is a continuation of application No. 08/287,807, Aug. 9, 1994, Pat. No. 5,445,294, which is a division of application No. 08/063,662, May 20, 1993, Pat. No. 5,392,951.

[51] Int. Cl.[6] .................. G06F 7/00

[52] U.S. Cl. .................. 364/479.14; 364/479.12; 221/12; 221/2; 221/4

[58] Field of Search .................. 221/2, 206, DIG. 1, 221/4, 5, 207, 244, 256, 258, 271, 276, 125, 130, 131, 295, 152, 153, 12, 13; 364/479.12, 479.14, 479.06, 479.03

[56] References Cited

U.S. PATENT DOCUMENTS

| | | |
|---|---|---|
| 3,556,342 | 1/1971 | Guarr . |
| 4,019,793 | 4/1977 | Gerding . |
| 4,114,965 | 9/1978 | Oye et al. . |
| 4,127,311 | 11/1978 | Weiman . |
| 4,267,942 | 5/1981 | Wick, Jr. et al. . |
| 4,518,208 | 5/1985 | Marder . |
| 4,588,237 | 5/1986 | Marder . |
| 4,813,753 | 3/1989 | Relyea . |
| 4,847,764 | 7/1989 | Halvorson . |
| 4,967,928 | 11/1990 | Carter . |
| 5,014,875 | 5/1991 | McLaughlin et al. . |
| 5,047,948 | 9/1991 | Turner . |
| 5,087,107 | 2/1992 | Fumanelli . |
| 5,139,321 | 8/1992 | Beardsley . |
| 5,159,581 | 10/1992 | Agans . |
| 5,190,185 | 3/1993 | Blechl . |

*Primary Examiner*—William E. Terrell
*Assistant Examiner*—Khoi H. Tran
*Attorney, Agent, or Firm*—Michael D. Steffensmeier

[57] ABSTRACT

A mechanical system opens a selected drawer in a multiple-drawer cabinet. The drawers are arranged in rows and columns. A selected drawer is unlatched by moving a rod which has protruding fingers, only one of which is positioned to engage a latch in a column of drawers. When the rod moves longitudinally, the selected drawer becomes unlatched. The unlatched drawer can open only to a distance determined by a cable which unwinds from a drum and passes around a pulley attached to the drawer. Thus, by controlling the rotation of the drum, the system can be programmed to open the drawer only to a distance which exposes the first non-empty compartment in the drawer. A computer controls the selection and opening of the drawers. The computer keeps a record of which compartments of each drawer have been emptied. Each time a drawer is opened, it is opened to the next non-empty compartment, allowing access to one and only one compartment in the drawer. The invention is therefore especially useful in dispensing medications and other similar articles in a hospital environment.

18 Claims, 7 Drawing Sheets

DRAWER OPERATING SYSTEM

This application is a continuation of application Ser. No. 08/418,624, filed Apr. 7, 1995, which is a continuation of application Ser. No. 08/287,807, filed Aug. 9, 1994, now U.S. Pat. No. 5,445,294, which is itself a division of application Ser. No. 08/063,662, filed May 20, 1993, now U.S. Pat. No. 5,392,951.

BACKGROUND OF THE INVENTION

The present invention provides an automated system for controlling the opening and closing of drawers in a cabinet. The invention is especially useful in medical applications, wherein one desires to dispense controlled amounts of medications to patients. The invention can also be used in other contexts.

In a hospital environment, it is often desired to dispense a specific number of items automatically, where the items are selected from a variety of possible choices. Dispensing machines have been known in non-medical applications, such as in the vending of candy, soda, and cigarettes, and in the dispensing of currency through automated teller machines. Unlike the latter devices, which generally dispense articles having a fairly consistent size and shape, a hospital environment requires the dispensing of many different kinds of items having many different sizes. For example, a dispensing device used in a hospital might dispense not only pills but also hypodermic needles and bottles, all of differing sizes.

It is possible to dispense a wide range of packages simply by providing a large number of different-sized drawers which are individually opened on command. Packages of different sizes could be stored within different drawers. The drawers can be subdivided to allow multiple packages or multiple doses of drugs to be stored within a single drawer.

Many devices have been developed for dispensing multiple doses of medications to patients, especially in hospital environment. Such devices often take the form of cabinets having a plurality of drawers. Examples of such cabinets appear in U.S. Pat. Nos. 5,139,321, 4,813,753, 4,518,208, 4,588,237, 4,019,793, 4,114,965, and 4,127,311.

Various devices have been developed which automate, or partially automate, the operation of cabinets containing medications. For example, U.S. Pat. No. 5,047,948 shows an automated medicine dispenser in which a stop in the cabinet limits the movement of a door to restrict access to drugs by the patient.

Other patents showing computer-controlled medicine dispensing devices include U.S. Pat. Nos. 5,159,581 and 4,967,928. Similarly, U.S. Pat. No. 4,267,942 shows a partially-automated drug dispensing cabinet having structure which limits access to the items stored inside the cabinet.

U.S. Pat. No. 5,014,875 describes an automated drug dispensing unit comprising a cabinet having multiple drawers. The unit is programmed to unlock one drawer at a time. One or more drawers hold trays having multiple compartments, and each tray rotates under a plate having an opening, thus permitting access to only one compartment of the tray.

Because of the wide variety of items stored in a medical cabinet, it is advantageous to provide a cabinet having a plurality of drawers, all of the drawers being of the same size, wherein each drawer is limited in its travel to allow access only to a predetermined number of drawer compartments. For example, if a drawer containing twenty hypodermic needles is full, and the operator requires two units, the drawer could be opened so as to expose only the first two compartments. If the next user requires one unit, the drawer would then open to expose the first three compartments, since the first two would already be empty. A computer would keep a record of the contents remaining in each drawer so as to take the proper action on the next request.

There are many mechanisms which could be used to limit the opening of a drawer to a specific distance. However, in a typical cabinet for dispensing medicines, as used in a hospital, there may be up to 72 drawers, and the cost of providing individual control mechanisms for each drawer can be prohibitive.

The present invention therefore provides a mechanism which enables automatic opening of one selected drawer of a cabinet, and which opens that drawer to a predetermined distance. The drawer operating system of the present invention does not require separate controls for each drawer, but instead uses controls which are common to a plurality of drawers. Thus, the present invention provides a practical solution to the problem of automatic dispensing of medications.

SUMMARY OF THE INVENTION

The present invention comprises a drawer operating system suitable for use in controlling the drawers of a medication dispensing cabinet. The drawers of the cabinet are arranged in rows and columns. The present invention includes a mechanism for unlatching a single selected drawer, and another mechanism for allowing that drawer to open only to a selected distance.

The unlatching mechanism includes a plurality of vertical rods, one rod for each column of drawers. Each rod has a plurality of fingers disposed around the circumference of the rod. On each rod, there is one finger corresponding to each drawer of the column. The fingers engage latches which permit the drawers to open under the influence of springs. For a given position of a rod, only one finger can engage a latch; the other fingers are disposed in positions which do not engage any latch. Rotation of the rod around its longitudinal axis positions a different finger to engage a different latch. The actual unlatching of the drawer occurs when the entire rod is moved longitudinally, under control of a suitable gearing arrangement, so that the finger pushes on the latch.

A second mechanism controls the distance to which the drawer can open. This second mechanism comprises a pulley system having one cable for each column of drawers, the cables being wound around a common drum. The drum unwinds, under the control of a computer, by an amount sufficient to allow the unlatched drawer to open to the permitted distance. Any slack in the cable is automatically taken up by a tensioning device. Thus, the drum pays out cable simultaneously to all of the columns of drawers, even though only one column contains a drawer which opens. The excess cable in the other columns is taken up by the respective tensioning devices.

The entire system is controlled electronically. An encoder connected to the drum provides information on the instantaneous angular position of the drum, and allows a computer to determine by how much the drum should be turned. A servomechanism then turns the drum according to a signal from the computer.

The present invention therefore has the primary object of providing an operating system for a plurality of drawers.

The invention has the further object of providing a system for automatically opening one of a plurality of drawers of a cabinet.

The invention has the further object of providing a system which automatically opens a drawer of a cabinet to a specified distance, to allow access to a limited portion of the contents of the drawer.

The invention has the further object of facilitating and automating the distribution of medications and medical devices.

The reader will recognize other objects and advantages of the present invention, from a reading of the following brief description of the drawings, the detailed description of the invention, and the appended claims.

DETAILED DESCRIPTION OF THE INVENTION

Figure 1:
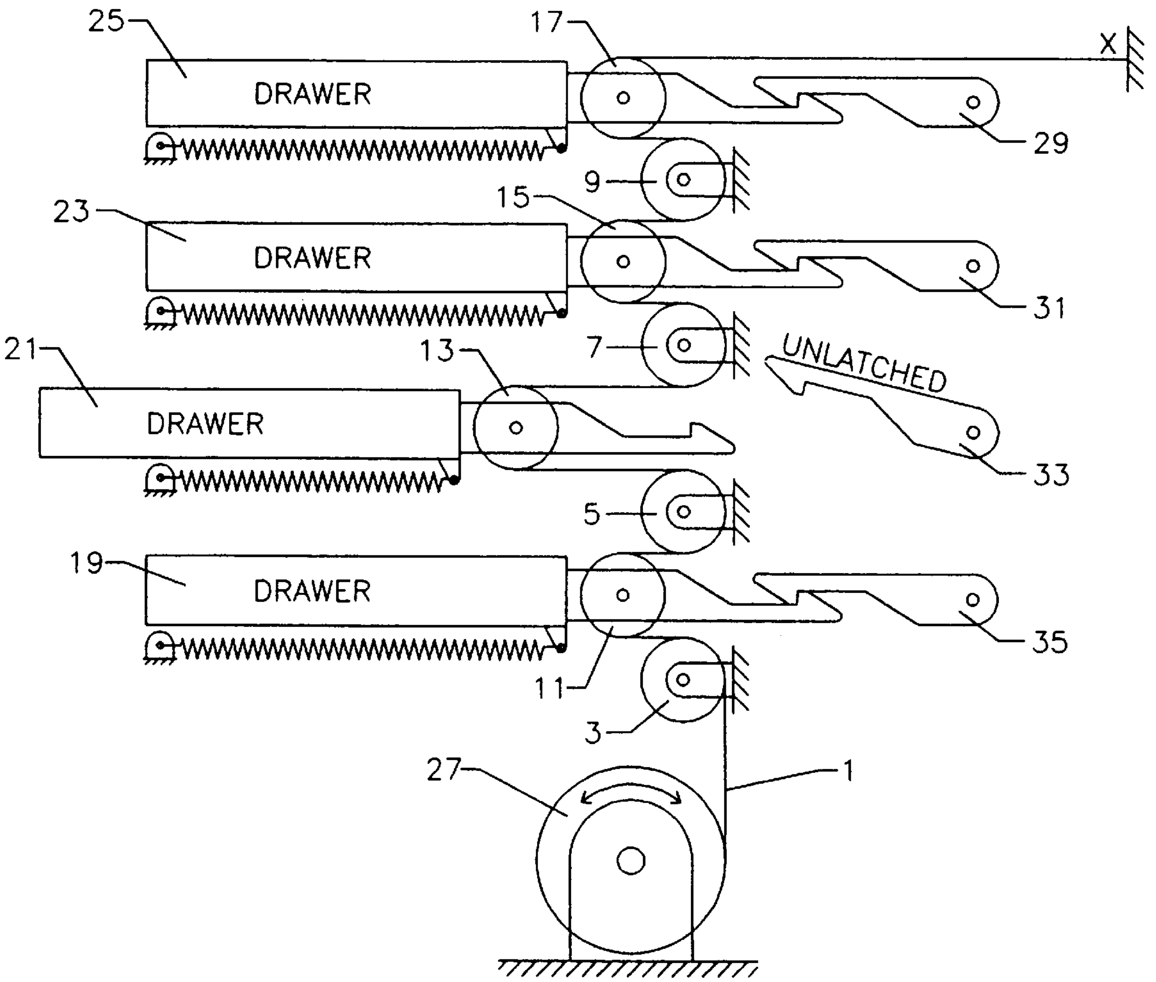
FIG. 1 provides a schematic diagram of one embodiment of the pulley system which controls the movement of drawers in the present invention.

FIG. 1 shows a schematic diagram of one arrangement of a pulley system for controlling the movement of a column of drawers. Cable 1 is threaded over fixed pulleys 3, 5, 7, and 9, and over movable pulleys 11, 13, 15, and 17. The movable pulleys are attached to drawers 19, 21, 23, and 25, respectively. The upper end of cable 1 is fixed at point X. Point X may represent the frame of the cabinet which houses the drawers, or it may be some other fixed point. The lower end of cable 1 is attached to cable drum 27. The drawers are normally held closed by latches 29, 31, 33, and 35, which engage corresponding members attached to each drawer. A motor (not shown) controls cable drum 27 to limit the amount of cable unwound from the drum, thereby limiting the distance to which the drawer can open.

In operating the arrangement of FIG. 1, one first unlatches one of the drawers (such as latch 33, as shown, for example, in FIG. 1). The drum is then rotated, or allowed to rotate, until the drawer 21 has moved to the desired distance. The drum then stops, preventing further motion of the drawer. When the drawer is manually closed, the cable is automatically rewound on the drum. Alternatively, the motor can automatically close the drawer at a desired time. The operation is the same for each of the other drawers, except that a different latch is opened for each drawer.

In the embodiment of FIG. 1, one could provide solenoids to operate each latch, and the cable drum could be spring-biased to pull the drawers closed. An encoder on the drum shaft (not shown) would provide the controller with information on the position and motion of the drawer. When the operator pulls the drawer open manually to the desired position, the controller would activate a brake or other latching device to prevent further unwinding of cable from the drum, thereby stopping the drawer. The spring in the drum would close the drawer as soon as the operator released it.

The above-described arrangement has the advantage of simplicity. But it requires the operator to open the drawer manually, and to hold it open to prevent it from slamming shut. Therefore, the preferred embodiment, described below, provides more automatic operation, and avoids the problems mentioned above.

Figure 2:
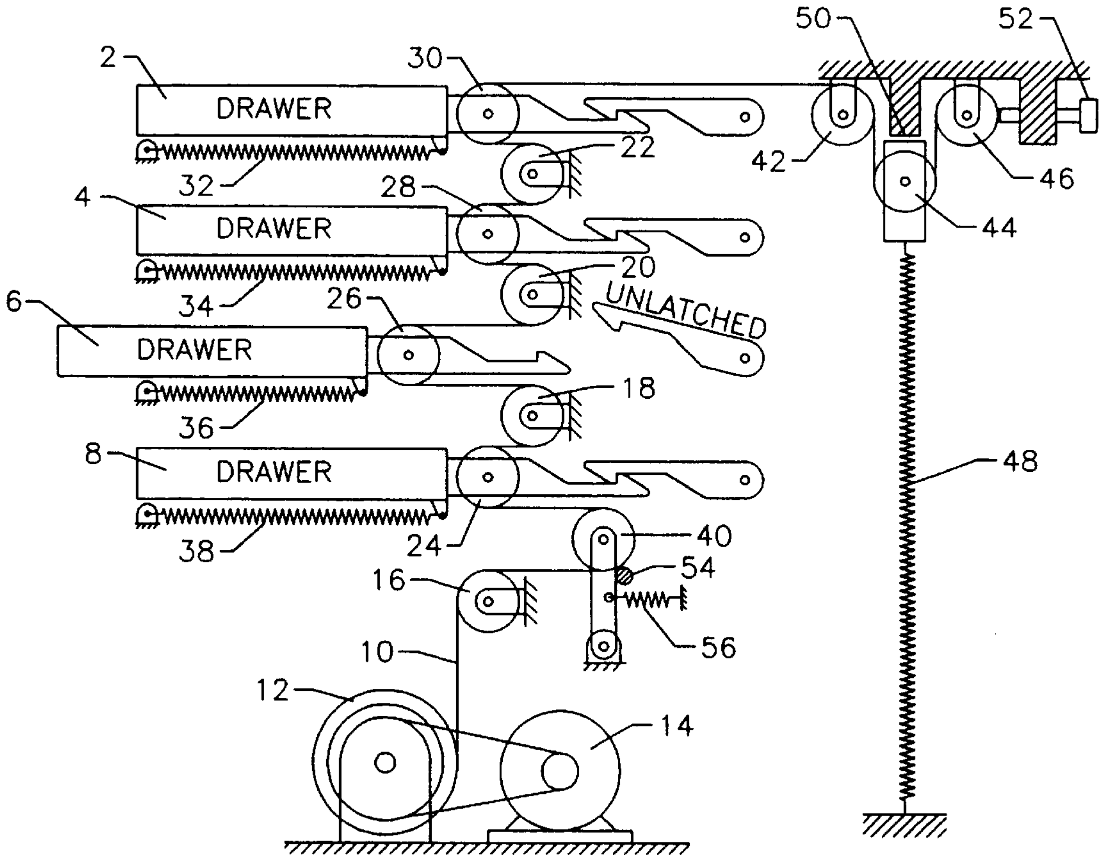
FIG. 2 provides a schematic diagram of the preferred embodiment of the pulley system which controls the movement of drawers.

FIG. 2 shows a schematic diagram of the preferred embodiment for controlling the movement of the drawers. In FIG. 2, drawers 2, 4, 6, and 8 are controlled by cable 10 which is unwound from drum 12. Servomotor 14 operates the drum through a belt drive, as shown. Cable 10 is threaded over fixed pulleys 16, 18, 20, and 22, and movable pulleys 24, 26, 28, and 30. The movable pulleys are attached to drawers 8, 6, 4, and 2 respectively. The drawers are spring-biased by springs 32, 34, 36, and 38. When a drawer is unlatched, and when cable has been unwound from the drum, the spring causes the drawer to open immediately. Regulating the speed and acceleration of the motor controls the speed and acceleration of the drawer. Turning the motor so as to wind cable 10 onto drum 12 causes an open drawer to become closed. When enough cable has been wound onto the drum, the latch will again become engaged.

Note that, instead of using a belt drive, one could connect motor 14 with drum 12 by a direct drive arrangement or by gears. Such alternatives are within the scope of the present invention.

Cable 10 passes over fixed pulley 16, over overtravel idler pulley 40, over the fixed and movable pulleys associated with the various drawers, then over fixed pulley 42 and tensioning pulley 44, and finally to cable length adjustment drum 46. The overtravel idler pulley 40 and the adjustment drum 46 will be discussed in more detail later.

Spring 48 pulls on tensioning pulley 44 to assure that the cable does not become slack. A weight could be used instead of spring 48. If a drawer does not open as expected, or if a drawer is prevented from opening fully, the excess cable unwound from drum 12 will be taken up by the downward motion of pulley 44. The tension of springs 32, 34, 36, and 38 is always greater than the tension of spring 48, so that In normal operation, the drawers will open with no motion of tensioning pulley 44. If a drawer is pushed shut manually without the use of motor 14, or if it is pushed shut more quickly than the motor can rewind the cable, the excess cable would be taken up by the downward motion of tensioning pulley 44. The excess cable would then be rewound onto the drum in preparation for the next operating cycle, and the tensioning pulley would return to its normal position as shown in FIG. 2. The tensioning pulley is shown at the top end of the cable, but it could be placed anywhere along the cable.

FIG. 2 shows a single column having four drawers disposed vertically. The number of drawers in the column can be varied; the same approach could be used with columns having a dozen or more drawers. Still more drawers can be added by providing several columns of drawers.

Figure 3:
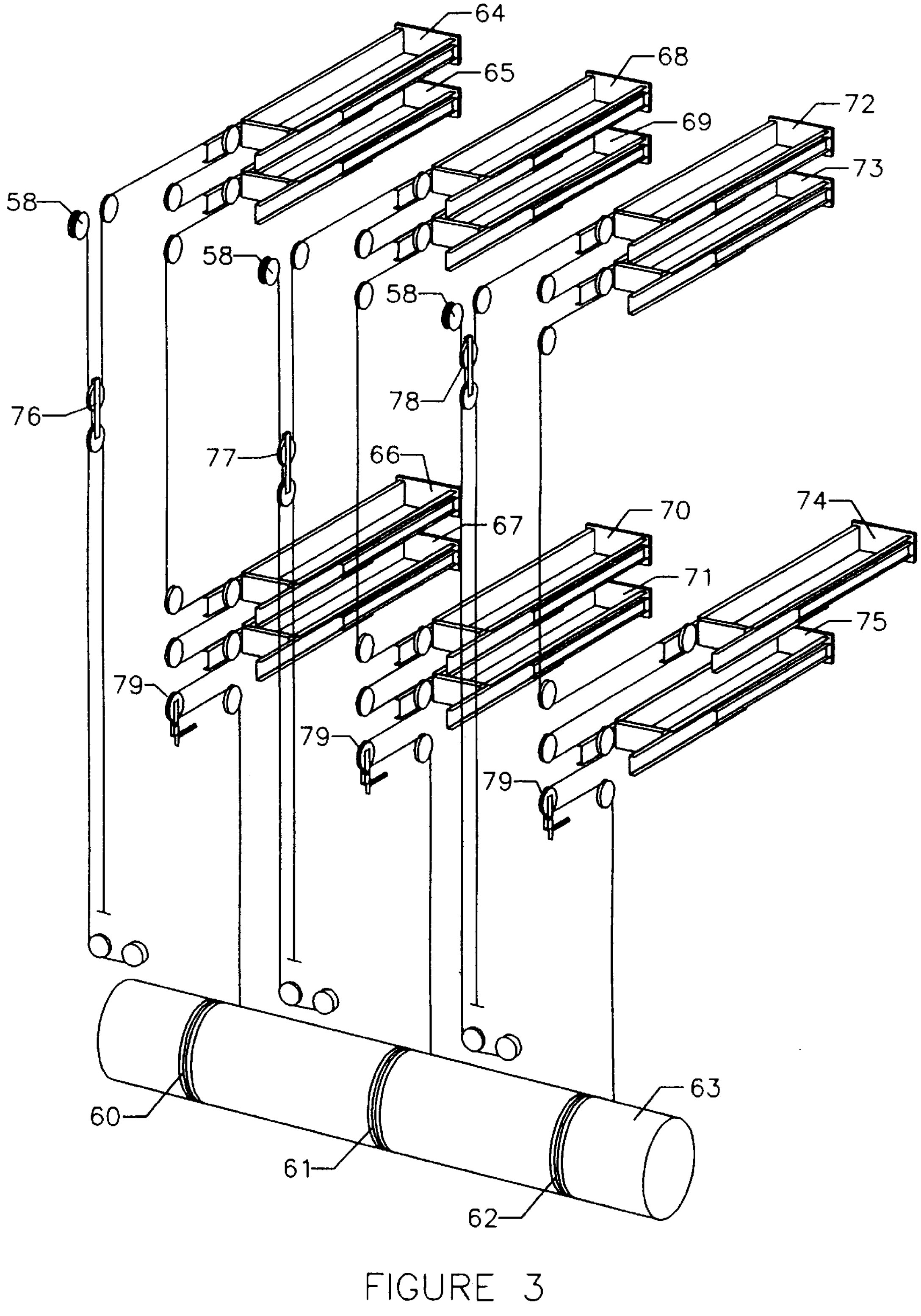
FIG. 3 provides an exploded and fragmentary perspective view of a pulley system which controls the movement of drawers, in an embodiment having three columns of drawers.

FIG. 3 shows a three-column arrangement of drawers, in an exploded and fragmentary perspective view. Each column contains four drawers, the drawers of each column being shown grouped in two pairs, for clarity of illustration. In FIG. 3, drawers 64, 65, 66, and 67 form one column, drawers 68, 69, 70, and 71 form a second column, and drawers 72, 73, 74, and 75 form the third column. Drawer 74 is the only drawer that is open at the moment depicted in FIG. 3. Each of cables 60, 61, and 62 is threaded around all of the pulleys of the respective columns of drawers. All of the cables are wound on a common drum 63. Each column of drawers has its own system of pulleys, which system is equivalent to that shown in FIG. 2. The dotted lines in FIG. 3 represent the portions of the cables that have been unwound. The cables are also attached to tensioning pulley systems 76, 77, and 78 disposed in the respective columns.

Before the selected drawer can open, it must first be unlatched, and the drum must also unwind enough cable to allow the drawer to open. Because a single drum contains all the cables for all the columns of drawers, unwinding of one cable requires the unwinding of all the cables. The tensioning pulley makes it feasible to unwind cable from the drum, into all of the columns, even for those columns in which no drawer has been unlatched. The tensioning pulleys associated with those columns take up the slack created by the unwinding of the cable. In the column containing the drawer which has been unlatched, the unwinding of the cable permits the drawer to open under the influence of its spring, to the extent that the cable is unwound. Thus, the tensioning pulley is a key feature which permits a single cable drum to handle more than one column of drawers.

In a multiple-column embodiment, one must provide means for accommodating differences and/or changes in cable length from one column to the next. Suppose, for example, that there are two columns of drawers, and that one cable is longer than the other. Suppose that the cable in the first column, which contains an open drawer, is longer than the cable in the second column. When the motor turns the drum to wind up the two cables, the open drawer moves towards its latched position, while in the second column, cable is removed from the tensioner take-up loop. However, because the cable in the second column is shorter, the drum can wind up cable only until the tensioning pulley reaches stop 50, shown in FIG. 2. Thus, the drum will stop when the tensioning pulley in the second column reaches its stop. Since the cable in the first column is longer, the drawer will not have reached the latch point when the drum stops.

The same problem can occur when there are more than two columns, such as in the embodiment of FIG. 3. In general, the drum will stop when the tensioning pulley associated with the shortest cable reaches its stop.

The present invention includes two means for accommodating the problems caused by differences in cable lengths. First, a manual cable length adjustment drum permits the operator to match the lengths of the cables when the system is installed or serviced. The adjustment drum is illustrated as item 46 in FIG. 2, but is otherwise similar to an adjustment drum that would be used in a multiple-column system. Rotation of adjustment drum 46 changes the effective length of the cable. The adjustment drum is then locked into the desired position by screw 52 or its equivalent. The latter procedure is especially useful when there are different numbers of drawers in different columns. For example, if a drawer is omitted from a particular column, such as when several small drawers are replaced by a larger one, the excess cable may be wound up onto adjustment drum 46 which is then locked in place.

The second means for accommodating differences in lengths of the cables is the overtravel assembly. For convenience of illustration, the overtravel assembly is also shown in the single-column embodiment of FIG. 2, but it is understood that the overtravel assembly is particularly helpful in a multiple-column system. The overtravel assembly, the major component of which is overtravel idler pulley 40, is shown between drum 12 and the bottom drawer, in FIG. 2, but in practice it could be anywhere along the cable. When the cables in a multiple-column array are reeled in to close a drawer, and one of the cables first becomes taut, the cable tension increases to reach a level sufficient to pull the overtravel idler pulley 40 away from its stop 54. The overtravel idler pulley is normally held against stop 54 by spring 56. As the overtravel idler pulley moves away from its stop, additional cable can be wound onto the drum. The drum continues to wind up a small amount of cable while the overtravel idler pulley in each column may move away from its associated stop. Thus, all cables will be taut and the desired drawer will have been latched.

Normally the winding of all of the cables is completed substantially simultaneously. Thus, the overtravel idler pulley will not usually need to move much; typically, the pulley will move one-half inch or less. Note also that the springs 56 have stiffness greater than the stiffness of springs 48; in the preferred embodiment, spring 56 is at least seven times stiffer than spring 48.

The above-described solutions for the problem of differences in cable lengths are implemented in the embodiment of FIG. 3, with over-travel idler pulleys 79 and adjustment drums 58.

The drawer operating system of the present invention is preferably controlled by a computer or its equivalent. Therefore, various switches and sensors (not shown in FIG. 2) are necessary to provide information to the computer concerning the state of the system. For example, a switch is provided on (or near) the overtravel idler pulleys 40 to signal when any of these pulleys have contacted their stops 54. A similar switch is provided on (or near) each tensioning pulley 44 to indicate contact with stops 50. An encoder on the motor or drum shaft determines the amount of cable unwound from the drum. Limit switches on the drum prevent the drum from unwinding excessive amounts of cable in the event of a control malfunction.

Encoders are also attached to fixed pulleys 42 to indicate the amount of cable traveling to or from the respective tensioning pulleys 44. The computer uses the information from these encoders, together with the information from the encoders on the drum or motor, to determine the actual positions of the drawers.

The switches associated with the tensioning pulleys 44 are also used to initiate the sequence of operations for closing a drawer. If the operator pushes an open drawer closed slightly, the tensioning pulley 44 will move away from its stop 50, changing the state of the switch. The controller then assumes control and completes the closing of the drawer.

It is possible to unlatch the drawers by placing a solenoid-operated latch at each drawer. However, the cost of providing a solenoid for each drawer, plus the necessary wiring, power drivers, and input/output ports, is high, especially where there is a large number of drawers in one cabinet. Also, to insure reliability of opening and closing, it is necessary to use powerful and noisy solenoids.

The present invention eliminates the need for numerous, relatively high-powered solenoids, and instead provides a drawer unlatching mechanism which uses only one solenoid per column, and which requires two small motors, one to select a row, and the other to unlatch the drawer in the selected column.

Figure 4:
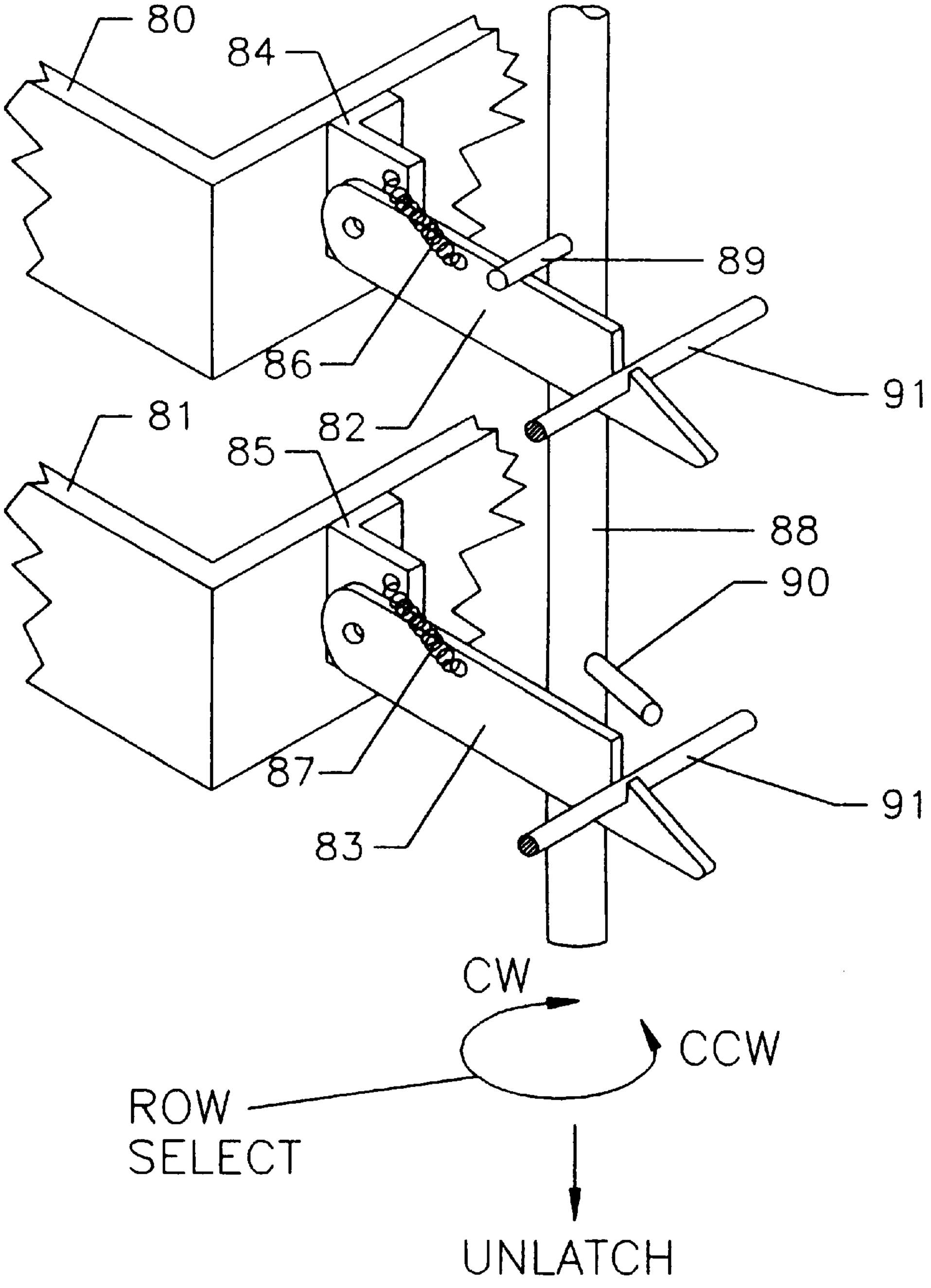
FIG. 4 provides a fragmentary perspective view showing the structure and operation of the mechanism for unlatching a selected drawer.

FIG. 4 shows a fragmentary perspective view of the basic mechanism for unlatching a selected drawer. Drawers 80 and 81 comprise two drawers in the same column. FIG. 4 shows only two drawers in the column, for the sake of simplicity of illustration. The drawers 80 and 81 are attached to drawer latches 82 and 83, by brackets 84 and 85, respectively. The drawer latches 82 and 83 can pivot within the brackets. Downward pivoting movement is opposed by springs 86 and 87. The drawer latches engage with fixed rods 91. The fixed rods 91 are shown only in fragmentary form in FIG. 4, for clarity of illustration; the figure shows how the fixed rods normally prevent the latches from opening.

A rod 88 has fingers 89 and 90 extending from the rod. There is one finger for each drawer in the column. The fingers are located at different positions around the circumference of the rod. For a given position of the rod, at most one finger can engage one of the drawer latches. In the example shown in FIG. 4, finger 89 engages drawer latch 82, while finger 90 misses drawer latch 83. Linear movement of the rod, along its longitudinal axis, thus opens at most one of the latches. The drawer to be opened is selected by rotating the rod around its longitudinal axis, so as to bring a finger into engagement with the latch associated with the selected drawer.

In the general embodiment, wherein there are more than two drawers in a column, the rod will have a plurality of fingers, spaced at equal angular distances around the circumference of the rod. Thus, for a 12-row system, the fingers are spaced 30° apart. Rotation of the rod around its longitudinal axis thus selects the desired row of drawers.

Figure 5:
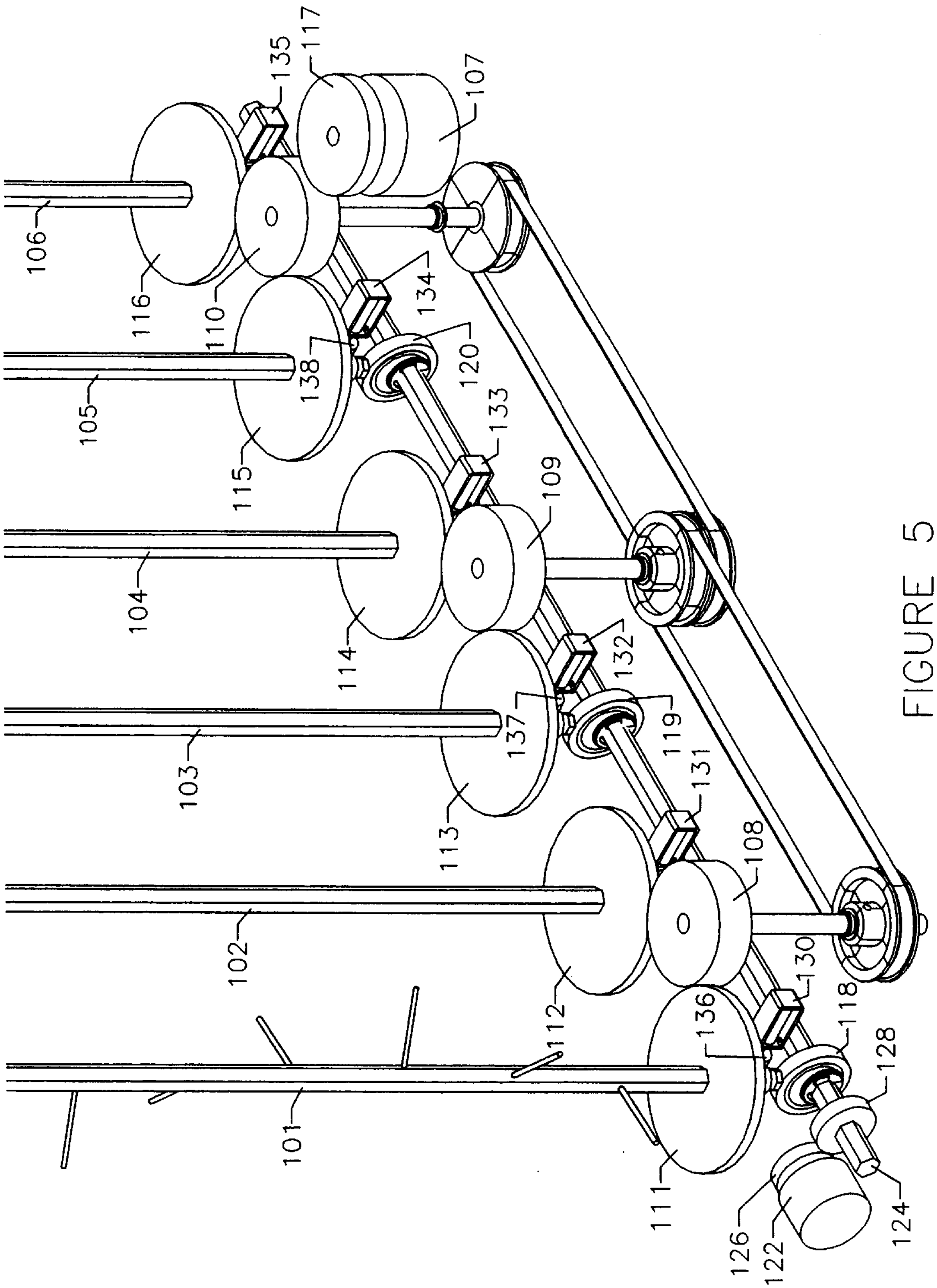
FIG. 5 provides a perspective view of the mechanism for controlling the rods which unlatch the selected drawer.

FIG. 5 shows the mechanism used to select the desired column of drawers. In FIG. 5, there are six rods 101, 102, 103, 104, 105, and 106. The rods correspond to rod 88 of FIG. 4, each rod having fingers arranged as described above. In the example shown, the system can address six rows and six columns of drawers. Additional fingers could be added to address additional rows. Additional rods could be added to address more columns. Positioning motor 107 rotates the rods around their longitudinal axes, through the action of gears 108–117, so as to select a row of drawers. Note that gears 108 and 109 are driven by a belt and pulley arrangement which is ultimately connected to gear 110.

In the position shown in FIG. 5, all the rods rest on eccentrics, only three of which (118, 119, 120) are visible in the view of FIG. 5. Note that if the eccentrics were not present, and the rods were all lowered at once, an entire row of drawers would be unlatched.

The eccentrics raise and lower the rods when motor 122 turns shaft 124 through gears 126 and 128. However, since one normally wants to open only a single drawer at one time, solenoids 130–135 enable the selection of individual columns. Attached to the armature of each solenoid is an interposer. Three such interposers 136–138 are partly visible in FIG. 5. The interposers normally prevent the rods from dropping down when the eccentrics rotate out of the way. Only when a solenoid is energized is the interposer retracted to allow the rod to follow the contour of the eccentric. Thus, one selects a column simply by energizing a solenoid to retract the interposer, and by rotating the shaft containing the eccentrics.

Figure 6A:
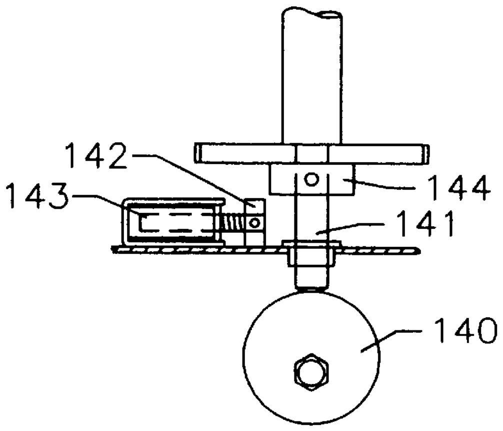
FIGS. 6*a*, 6*b*, 6*c*, and 6*d* are all fragmentary views of one of the rods which unlatches a selected drawer, showing how the associated solenoid allows a rod in the selected column to move longitudinally.
Figure 6B:
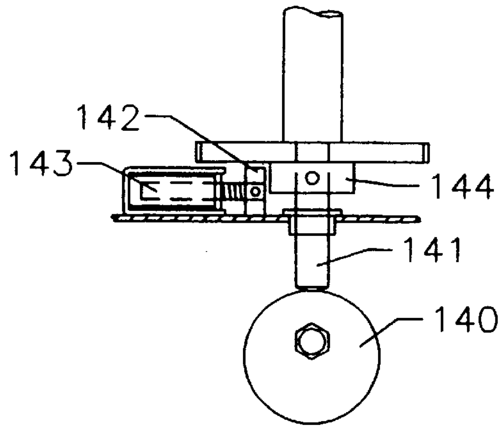
Figure 6C:
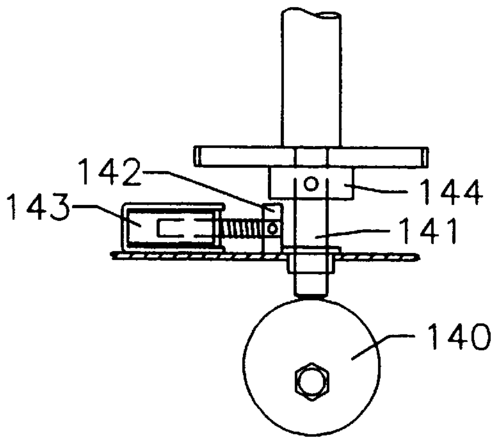
Figure 6D:
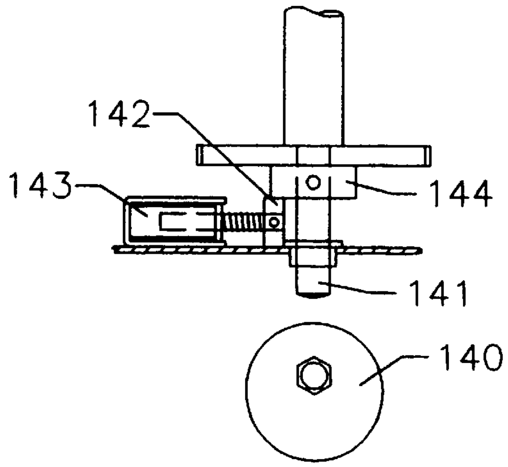

FIGS. 6*a*–6*d* provide more details of the operation of the solenoids and interposers. FIGS. 6*a* and 6*b* depict the solenoid in the selected column, wherein the solenoid is energized. FIGS. 6*c* and 6*d* depict a solenoid in one of the unselected columns, wherein the solenoid is not energized. FIGS. 6*a* and and 6*c* represent the conditions wherein the system is "at rest", i.e. wherein all the drawers remain latched. FIGS. 6*b* and 6*d* represent the condition wherein the system is actuated, i.e. wherein a drawer is being unlatched.

In FIG. 6*a*, eccentric 140 is in a position that keeps rod 141 in a raised position, so that none of the fingers (not shown in FIG. 6) can engage any latch of any drawer. In FIG. 6*b*, the system is actuated, meaning that eccentric 140 has turned to allow rod 141 to move downward, thereby unlatching the selected drawer. Note that in FIG. 6*b*, solenoid 143 is energized, and therefore pulls interposer 142 out of the way of flange 144 of rod 141. Thus, the rod is free to move longitudinally when the eccentric rotates. Note that in FIG. 6*a*, the interposer is also out of the way of flange 144, but that the rod does not move longitudinally due to the position of the eccentric.

In FIG. 6*c*, the solenoid is de-energized, and the interposer 142 blocks any possible movement of flange 144 and rod 141. The eccentric also prevents the rod from moving longitudinally in FIG. 6*c*. In FIG. 6*d*, the eccentric has moved away from the rod, but the rod does not move because it is still blocked by interposer 142, due to the fact that the solenoid is still de-energized.

Thus, FIGS. 6*a*–6*d* show that by energizing a single solenoid, one can select a column in which a rod can be moved to open the selected drawer.

Figure 7:
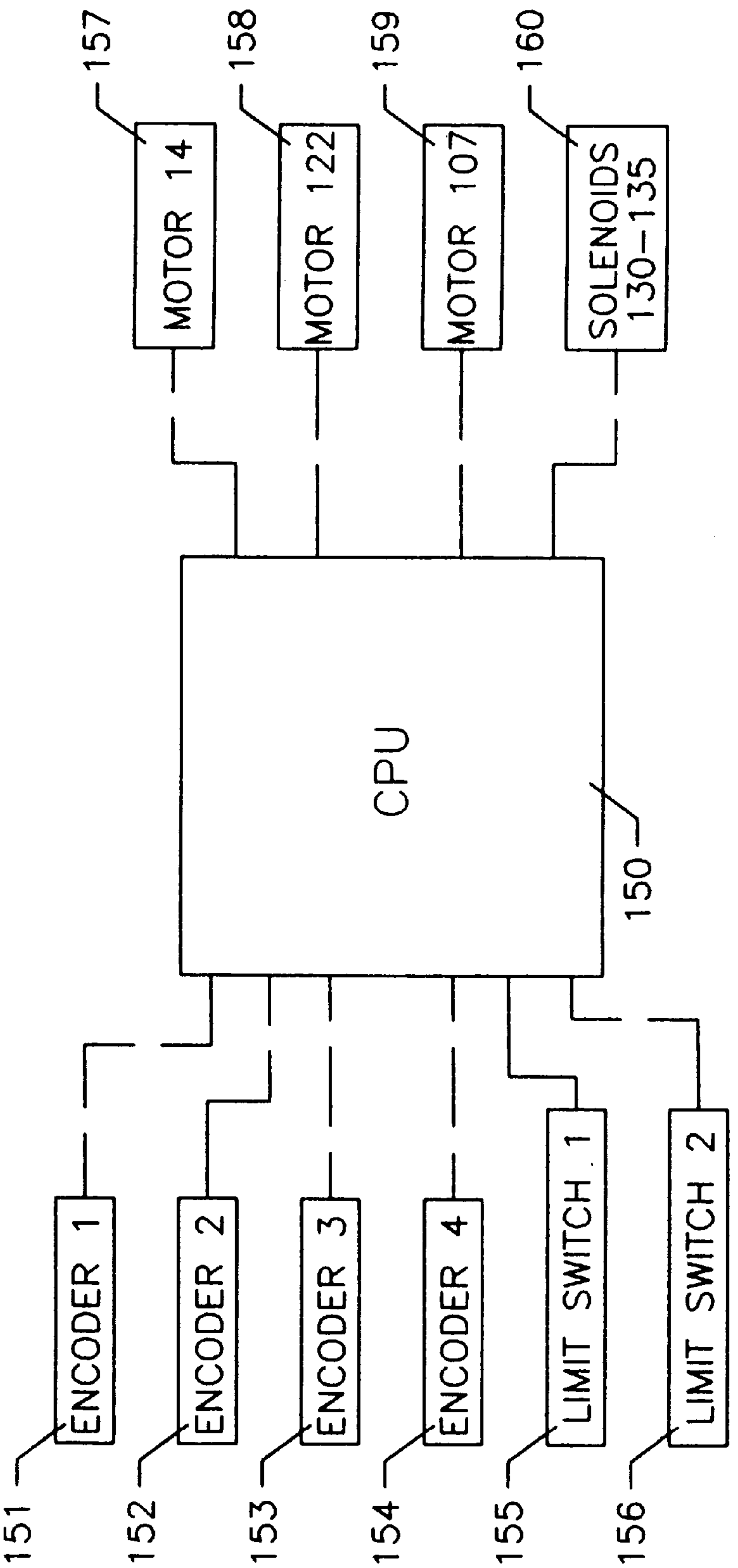
FIG. 7 provides a block diagram showing the computer which controls the operation of the drawers, and which shows the inputs and outputs of the computer.

FIG. 7 provides a block diagram which shows the major inputs and outputs to the computer which controls the system of the present invention. Central processing unit (CPU) 150 can be a microprocessor or its equivalent. The inputs are shown on the left-hand side of the CPU and the outputs are shown on the right-hand side.

The inputs to the CPU are as follows. Block 151 represents the encoder from drum 12. This encoder provides the CPU with information on the exact angular position of the drum. Block 152 represents the encoder connected to fixed pulley 42. This encoder provides the CPU with information on how much slack cable has passed the fixed pulley. Block 153 represents the encoder connected to positioning motor 107. This encoder provides feedback on the exact angular position of the rods 101–106 shown in FIG. 5, and enables the CPU to select the desired row. Block 154 represents the encoder connected to motor 122. This encoder enables the CPU to determine how long to operate so as to cause the desired rod to move so as to unlatch the desired drawer. Block 155 represents the limit switch affixed to (or near) the overtravel idler pulley 40. This limit switch tells the CPU whether or not pulley 40 is in contact with its stop 54. Block 156 represents the limit switch affixed to (or near) tensioning pulley 44. This limit switch tells the CPU whether or not the tensioning pulley is in contact with stop 50.

Note that, for a multiple-column embodiment, block 152 represents several encoders, since there is a fixed pulley for each column. Also, blocks 155 and 156 both represent a plurality of limit switches, because each column has its own overtravel idler pulley and tensioning pulley.

The outputs of the CPU comprise signals which control the various mechanical devices to accomplish the opening of the desired drawer. These devices are as follows. Block 157 represents motor 14 which drives the cable drum 12. Block 158 represents motor 122 which causes the rods to move longitudinally, thereby unlatching the desired drawer. Block 159 represents positioning motor 107 which rotates the rods around their longitudinal axes, to select the desired row. Block 160 represents the solenoids 130–135 which control the interposers which determine which rod will translate longitudinally to open the desired drawer.

The following summarizes a cycle of operation of the drawers. First, the operator, or the system itself, selects a drawer to be opened. This selection can be made automatically by the CPU. Or the operator could select a type of medical product, by a suitable entry on a keyboard, a "touchscreen" monitor, or on some other input device connected to the CPU. Based on the selected product, and on information stored by the CPU showing where each product is located, the CPU determines which drawer to open.

To open the selected drawer, motor 107 first rotates all the rods 101–106 together to position the fingers to engage latches in the selected row. One of the solenoids 130–135 is then energized to retract the interposer from the rod in the selected column. Motor 122 then rotates by 180° to translate the rod which has been freed by retraction of the interposer. The selected drawer is then unlatched. The solenoid is then de-energized. The cable drum then unwinds cable to open the drawer which has been unlatched. The drawer opens to a distance determined by the amount of cable unwound from the drum. The cables unwound into the other columns are taken up by the respective tensioning pulleys for each column. Motor 122 then rotates through another 180° to return the rod to its original position. The interposer springs back into place, ready for the next cycle. When commanded by the operator, the cable drum reels in the cable, closing the drawer and simultaneously recovering cable from the tensioning pulleys in the other columns. The drawer latches shut, and the overtravel idler pulleys assure that all cables are taut.

The CPU is preferably programmed to keep records of the contents of each drawer, and of the number of times the drawer was opened. Thus, when a given drawer is to be opened, the CPU determines how many times the drawer was previously opened (since the last initialization of the system) and opens the drawer to the exact distance which allows access to the next non-empty compartment in the drawer. For example, if a drawer contains 10 compartments, each containing an equal dose of medication, and if two of these compartments have been previously emptied, when the drawer is next opened, the CPU will cause the drawer to open to expose only the third compartment. The CPU will record, in its memory, the fact that access was gained to the third compartment, so that the next time the same drawer is opened, the drawer will open to expose the fourth compartment.

Thus, the CPU can not only keep records of what drugs and medications have been dispensed, but it can also control the extent of travel of each drawer, in allowing access to the authorized operator.

While the invention has been described with respect to certain preferred embodiments, the invention can be modified in many ways within the scope of the invention. As noted above, one can use different kinds of motors and different kinds of drive arrangements. One could interchange rows and columns; in most cases, springs could be replaced by weights, and vice versa, while preserving the basic method of operation of the system. Latches could be inverted, and need not appear exactly as shown in the drawings. One could even use separate drums for each column of drawers, although to do so would sacrifice the benefit of having only a single drum.

Note also that the present invention comprises two separable systems for operating a set of drawers. One could use the cable drive to open and close the drawers, without the latching mechanism. Or one could use the disclosed latching mechanism without the above-described cable drive arrangement.

The invention can be modified in still other ways. For example, instead of using a cable which directly restricts the movement of a drawer, the cable could cause a brake or ratchet latch to engage when the end of the cable is reached. This variation would require a somewhat more complex structure, but would have the advantage that the cable would need to be strong enough only to engage the brake or latch, and would not need to withstand abusive forces which an operator might exert while trying to open a drawer farther than allowed by the control mechanism.

Any of the above-described embodiments could be provided without the drawer opening springs. In this case, the drawers would be pulled open manually, while the maximum extent of opening would be limited by the amount of cable unwound from the drum. The drawers could be designed to "pop open" by a small distance to identify themselves to the operator.

In another variation, the cable and drum would be replaced by a movable frame, placed within the cabinet, the frame having openings for each drawer. The drawers would move freely through openings in the frame, except for flanges at the rear of the drawers. If the frame were positioned near the front of the cabinet, a drawer could open fully before the frame would stop the flange. If the frame were moved toward the rear of the cabinet, the drawer could be opened by a more limited distance before being stopped by the flange hitting the frame. A servo system could move the frame to the desired location by screws, racks and pinions, chains, cables, or other means. The drawer could be opened either manually or by a spring.

In a variation of the above-described alternative, the movable frame could be replaced by a plurality of movable stops which move in unison. Each movable stop would control the opening distance of one or more drawers. The stops could be moved by any of the structures mentioned above. They could stop the drawers directly, or they could engage a latch or a brake.

In still another alternative, a small hydraulic cylinder could be attached to each drawer and to a common fluid metering and pumping system. The cylinders would be attached such that evacuating liquid (typically oil) from the cylinder would cause a piston to move in a direction which opens the drawer. The other side of the piston would be open to the atmosphere so that atmospheric pressure could move the piston into the space vacated by the oil. The drawer would not move farther than the amount of oil removed from the cylinder would allow, as the piston would stop when it encountered the incompressible fluid. The maximum opening force would be limited to atmospheric pressure multiplied by the area of the piston, so impeding the opening of the drawer would not cause any damage.

All of the above-described modifications, and others which will be apparent to those skilled in the art, should be considered within the spirit and scope of the following claims.

What is claimed is:

1. A drawer operating system comprising:

a plurality of drawers, and one or more latches connected to each of said drawers, the drawers being movable linearly from a closed position to an open position, a selection structure for selecting at least one drawer to be opened and for unlatching said selected drawer, a structure for variably limiting a distance to which said drawer can move, record means for tracking the type of contents in each drawer, and for tracking said distance, and wherein said structure for variably limiting a distance to which said drawer can move is controlled in relation to said record means.

2. The system of claim 1, further comprising means for making a record of the distance to which the drawer is permitted to open.

3. The system of claim 2, wherein said structure for variably limiting a distance to which said drawer can move comprises means for setting a limit of travel for the drawer, said limit being greater than a previous limit of travel.

4. The system of claim 1 wherein said record means includes a CPU.

5. A drawer operating system comprising:

a plurality of drawers, and a latching means connected to each of said drawers, the drawers being movable linearly from a closed position to an open position, the drawers having a plurality of compartments, means for selecting a drawer to be opened and for unlatching said selected drawer, means for recording the type of contents in a drawer and determining a number of compartments in the drawer to be exposed, and for determining a distance to which said drawer can move, and for permitting the drawer to be opened no further than to said distance, and wherein the drawer, when opened to said distance, exposes said number of compartments.

6. The system of claim 5, further comprising means for making a cumulative record of each said distance to which the drawer has been permitted to open.

7. The system of claim 6, wherein the distance to which the drawer is permitted to travel is sufficient to expose a number of compartments which is greater than a number of compartments previously exposed.

8. The system of claim 5 wherein said means for recording includes a CPU.

9. A drawer operating system comprising:

a plurality of drawers, and a plurality of latches connected to each of said drawers, the drawers being movable linearly a predetermined distance from a closed position to an open position, a selection structure for unlatching a selected drawer, a structure for variably limiting the predetermined distance to which said drawer can move, a record means for making a record of a number of times the drawer is permitted to open, and of the distance to which the drawer is permitted to open at each such time, a memory structure for storing information on initial contents of the drawers, and wherein said record means comprises a means for automatically determining the remaining contents of each drawer.

10. A drawer operating system comprising:

a plurality of drawers, and a latching means connected to each of said drawers, the drawers being movable linearly from a closed position to an open position, the drawers having a plurality of compartments, a means for selecting a drawer to be opened and for unlatching said selected drawer, a means for determining a number of the compartments in the drawer to be exposed, and for determining a distance to which said drawer can move, and for permitting the drawer to be opened no further than to said distance, wherein the drawer, when opened to said distance, exposes said number of compartments, a means for making a record of a number of times the drawer is permitted to open, and of the number of compartments exposed at each such time, a means for storing information on initial contents of the drawers, and wherein the means for making a record comprises a means for automatically determining remaining contents of each drawer.

11. A drawer operating system comprising:

a plurality of drawers, and one or more latches connected to each of said drawers, the drawers being movable linearly a predetermined distance from a closed position to an open position, a selection structure for unlatching a selected drawer, a structure for variably limiting the predetermined distance to which said drawer can move, a recorder for making a record of the distance to which the drawer is permitted to open at each such time, and memory for storing information about the contents of the compartments in the drawers, and wherein said recorder tracks the remaining contents of each drawer.

12. The system of claim 11 wherein said information about the contents of the compartments in the drawers includes the type of the contents.

13. The system of claim 11 wherein said recorder includes a CPU.

14. A drawer operating system comprising:

a plurality of drawers, and a latch connected to one or more of said drawers, the drawers being movable linearly from a closed position to an open position, the drawers having a plurality of compartments, a selection structure for selecting a drawer to be opened and for unlatching said selected drawer, means for determining a number of the compartments in the drawer to be exposed, and for determining a distance to which said drawer can move, and for permitting the drawer to be opened no further than to said distance, wherein the drawer, when opened to said distance, exposes said number of compartments, a means for making a record of the number of compartments exposed at each such time, a means for storing information about the contents of the drawers, and wherein the means for making a record comprises a means for determining the remaining contents of each drawer.

15. The system of claim 14 wherein said means for making a record includes a CPU.

16. The system of claim 14 wherein said information about the contents of the compartments in the drawers includes the type of the contents.

17. A drawer operating and dispensing method comprising the steps of:

providing a cabinet having a plurality of drawers and one or more latches connected to one or more of said drawers, the drawers being movable linearly a predetermined distance from a closed position to an open position, unlatching a selected drawer, variably limiting the predetermined distance to which said drawer can move, making a record of the distance to which the drawer is permitted to open at each such time, and storing information about the type of contents in the compartments in the drawers.

18. A drawer operating and dispensing method comprising the steps of:

providing a cabinet having a plurality of drawers and a latch connected to one or more of said drawers, the drawers being movable linearly from a closed position to an open position, the drawers having a plurality of compartments, selecting a drawer to be opened and for unlatching said selected drawer, determining a number of the compartments in the drawer to be exposed, determining a distance to which said drawer can move, and permitting the drawer to be opened no further than to said distance, exposing said number of compartments when the drawer is opened to said distance, making a record of the number of compartments exposed at each such time, and storing information about the contents of the drawers.

* * * * *